(12) United States Patent
Crane et al.

(10) Patent No.: US 9,045,323 B2
(45) Date of Patent: Jun. 2, 2015

(54) BEVERAGE DISPENSING APPARATUS

(71) Applicant: Cornelius, Inc., St. Paul, MN (US)

(72) Inventors: Bryant Crane, Chicago, IL (US);
Thaddeus Jablonski, Palatine, IL (US);
David M. Joyce, Des Plaines, IL (US);
James Kasallis, Lombard, IL (US);
Jeffrey DeBuhr, Bartlett, IL (US)

(73) Assignee: Cornelius, Inc., St. Paul, MN (US)

( * ) Notice: Subject to any disclaimer, the term of this patent is extended or adjusted under 35 U.S.C. 154(b) by 327 days.

(21) Appl. No.: 13/625,144

(22) Filed: Sep. 24, 2012

(65) Prior Publication Data

US 2013/0074980 A1 Mar. 28, 2013

Related U.S. Application Data

(60) Provisional application No. 61/537,709, filed on Sep. 22, 2011.

(51) Int. Cl.
*B67D 1/08* (2006.01)
*B67D 1/00* (2006.01)

(52) U.S. Cl.
CPC ............ *B67D 1/0041* (2013.01); *B67D 1/0888* (2013.01); *B67D 1/0894* (2013.01); *B67D 2210/00076* (2013.01)

(58) Field of Classification Search
USPC ............... 141/1, 94, 104, 129, 163, 168–169, 141/172–174; 222/1, 23, 41
See application file for complete search history.

(56) References Cited

U.S. PATENT DOCUMENTS

| | | | |
|---|---|---|---|
| 4,590,975 A | | 5/1986 | Credle, Jr. |
| 4,951,719 A | * | 8/1990 | Wiley et al. ........................ 141/1 |
| 5,881,917 A | | 3/1999 | Jones et al. |
| 6,053,359 A | | 4/2000 | Goulet et al. |
| 6,102,146 A | | 8/2000 | Schmidt et al. |
| 6,102,246 A | * | 8/2000 | Goulet et al. ................... 221/11 |
| 6,871,676 B2 | | 3/2005 | Sus et al. |
| 7,577,498 B2 | | 8/2009 | Jennings et al. |
| 7,845,375 B2 | * | 12/2010 | Dorney ........................... 141/94 |
| 8,127,805 B2 | * | 3/2012 | Dorney ......................... 141/104 |
| 8,151,832 B1 | * | 4/2012 | Dorney ........................... 141/94 |

(Continued)

*Primary Examiner* — Nicolas A Arnett
(74) *Attorney, Agent, or Firm* — Andrus Intellectual Property Law, LLP (57) ABSTRACT

A process for dispensing a beverage into a cup comprising the steps of: providing a dispensing structure; providing a transportation mechanism linked with the dispensing structure; providing a staging structure linked with the transportation structure; providing a control system linked with the dispensing structure, staging structure and the transportation mechanism; providing a sensor mechanism linked with the control system, the sensor mechanism providing signals indicating the position of a cup; providing a cup identification system having an interactive display connected to the control system; picking a cup from a storage device and positioning it within a dispensing structure; dispensing ice and a beverage at separate locations within the dispensing structure; transporting the filled beverage to a staging structure; positioning the filled cup in the staging structure; removing the filled cup from the staging structure for sale to a customer wherein the cup identification system and the display outputs visual characteristics indicating the position and characteristics of a cup at every stage of the process.

26 Claims, 7 Drawing Sheets

(56) References Cited

U.S. PATENT DOCUMENTS

| | | | |
|---|---|---|---|
| 8,776,838 B1 * | 7/2014 | Dorney | 141/9 |
| 2002/0056721 A1 | 5/2002 | Phillips et al. | |
| 2006/0131323 A1 * | 6/2006 | Akuzawa et al. | 221/123 |
| 2007/0215239 A1 * | 9/2007 | Dorney | 141/94 |
| 2010/0147417 A1 * | 6/2010 | Dorney | 141/95 |
| 2013/0075426 A1 * | 3/2013 | Crane et al. | 222/129 |
| 2013/0282164 A1 * | 10/2013 | Veloo | 700/216 |
| 2014/0188271 A1 * | 7/2014 | Hernandez et al. | 700/232 |

* cited by examiner

BEVERAGE DISPENSING APPARATUS

CROSS-REFERENCE TO RELATED APPLICATIONS

This application claims priority of U.S. Provisional Application No. 61/537,709 filed Sep. 22, 2011, which is incorporated herein by reference.

FIELD OF THE INVENTION

The invention relates to beverage dispensing apparatus including dispensing and staging of drinks.

BACKGROUND OF THE INVENTION

Beverages may be dispensed through various valves such that fountain drinks may be prepared by restaurant employees. Commonly, restaurant employees may take an order and then manually pull cups and fill the beverages according to the order. There is therefore a need in the art for an improved beverage dispensing apparatus that is automated and allows a person filling an order to identify drinks grouped by order or type. There is also a need in the art for an improved beverage dispensing system that automates the drink dispensing procedure and transports beverages to a desired area where they may be identified and utilized by restaurant personnel.

SUMMARY OF THE INVENTION

In one aspect there is disclosed, a process for dispensing a beverage into a cup comprising the steps of: providing a dispensing structure; providing a transportation mechanism linked with the dispensing structure; providing a staging structure linked with the transportation structure; providing a control system linked with the dispensing structure, staging structure and the transportation mechanism; providing a sensor mechanism linked with the control system, the sensor mechanism providing signals indicating the position of a cup; providing a cup identification system having an interactive display connected to the control system; picking a cup from a storage device and positioning it within a dispensing structure; dispensing ice and a beverage at separate locations within the dispensing structure; transporting the filled beverage to a staging structure; positioning the filled cup in the staging structure; removing the filled cup from the staging structure for sale to a customer wherein the cup identification system and the display outputs visual characteristics indicating the position and characteristics of a cup at every stage of the process.

In another aspect there is disclosed, a process for dispensing a beverage into a cup comprising the steps of: picking a cup from a storage device and positioning it within a dispensing structure; dispensing ice and a beverage at separate locations within the dispensing structure; transporting the filled beverage to a staging structure; positioning the filled cup in the staging structure; removing the filled cup from the staging structure for sale to a customer wherein a cup identification system and display outputs visual characteristics indicating the position and characteristics of a cup at every stage of the process.

DETAILED DESCRIPTION OF THE PREFERRED EMBODIMENTS

It should be realized that the descriptions provided herein and made with reference to an X, Y and Z axis of the apparatus as shown in the drawings. The X axis may refer to a lateral axis or lateral movement. The Y axis may refer to a forward and backward axis and corresponding movement forward and backwards. The Z axis may refer to an up and down axis and corresponding movement up and down. These terms may be used interchangeably in the specification and claims.

Referring to FIGS. 1-10, there is shown one embodiment of a beverage dispensing apparatus 20. In one aspect, the beverage dispensing apparatus 20 includes a dispensing structure 22, a transportation mechanism 24, and a staging structure 26. In one aspect, the dispensing structure 22 may be decoupled from the transportation mechanism 24 and staging structure 26. The beverage dispensing apparatus may include a housing 28 that contains the various structures of the beverage dispensing apparatus.

Figure 1:
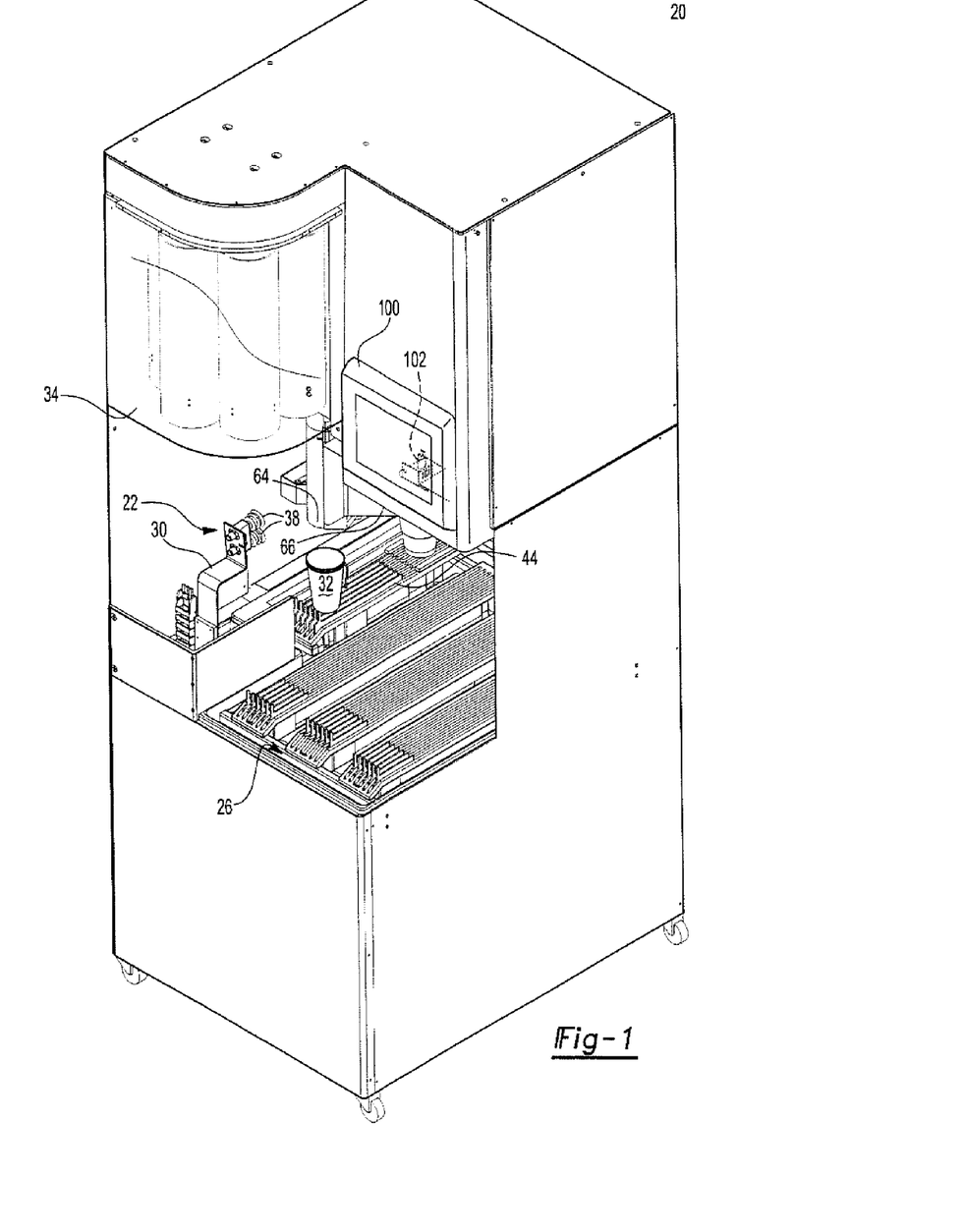
FIG. 1 is a perspective view of one embodiment of a beverage dispensing apparatus.
Figure 10:
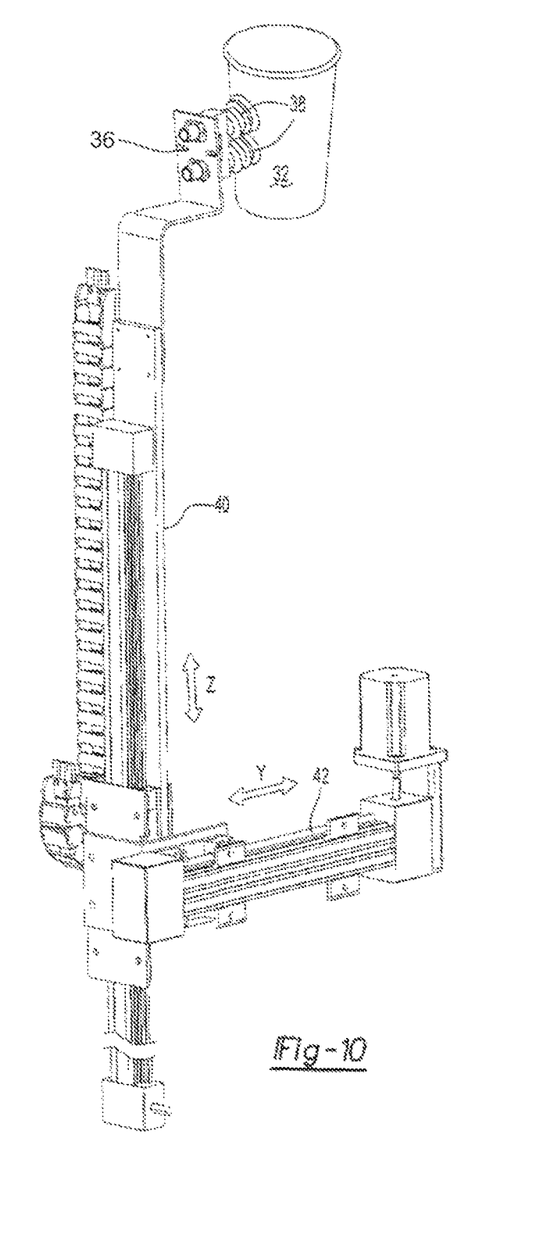
FIG. 10 is a partial perspective view of a cup placement device.

Referring to FIGS. 1 and 10, there is shown one embodiment of a dispensing structure 22 of the beverage dispensing apparatus 20. The beverage dispensing structure 22 may include a cup placement device 30. Various cup placement devices 30 may be utilized. For example, various gripping type mechanisms may remove a cup 32 from a storage bin 34 and position it for dispensing of ice and beverage. In the depicted embodiment, the cup placement device 30 includes actuators 36 having suction cup gripping mechanisms 38 that may be actuated using a pneumatic air control system 40 linked with the suction cups 38. Additionally, various actuators such as a Z and Y actuator 40, 42 as shown in the depicted embodiment may move the cup placement device 30 from one location to another such that cups 32 may be provided in a desired location.

The dispensing structure 22 also includes a dispensing lane structure 44. In the depicted embodiment, the dispensing lane structure 44 is positioned on a common X axis with the cup placement device 30. The dispensing lane structure 44 includes a rail grid 46 having spaces 48 between a plurality of rails 50 such that water or a beverage may pass through the grid 46. Additionally, the rail grid 46 includes an angled front edge 52 such that ice and foreign objects on the rail grid 46 may be moved from the rail by a lift platform 54, as will be described in more detail below. Additionally, the dispensing lane structure 44 includes a lift platform 54 having a raised front edge 56 and a plurality of rails 58 that are positioned to move within the spaces 48 defined in the rail grid 46 of the dispensing lane. The lift platform 54 is coupled with Y and Z actuators 60, 62 such that the platform may be moved along a Y direction of the rail grid 46 as well as in a Z direction or up and down relative to the rail grid 46. In this manner, the lift platform 54 may be moved below the rail grid 46 in the Y direction and then raised and lowered under a cup 32 that is positioned on the rail grid 46 such that the cup 32 may be moved from one location to another along the Y axis of the rail grid 46.

In one aspect, the lifting mechanism or Z actuator 62 is capable of at least supporting and lifting a minimum weight determined by the largest cup filled with beverage. Additionally, the Z actuator 62 may lift the lift platform 54 straight up and slow enough so that a cup 32 does not fall over or cause liquid to be sloshed over an edge of the side wall of the cup 32. Further, the stopping and starting for the Y actuator 60 which may be a linear type mechanism maybe chosen such that the acceleration and deceleration coupled with the velocity of the motor move the cup 32 in a stable manner.

The dispensing structure 22 additionally includes an ice dispenser 64 and a beverage dispensing valve 66 positioned above the rail grid 46 of the dispensing lane 44. In one aspect, the ice dispenser 64 and beverage dispensing valve 66 are positioned along the Y axis of the dispensing lane structure 44 and are spaced from each other along the Y axis. The dispensing lane structure 44 includes a position (D1) along the Y axis of the dispensing lane 44 that corresponds to an ice filling position below the ice dispenser 64. Additionally, the dispensing lane structure 44 includes a position (D2) along the Y axis of the dispensing lane 44 below the beverage dispensing valve 66 corresponding to a beverage filling position.

The dispensing structure 22 additionally includes an X transport structure 68 positioned along a back of the beverage dispensing apparatus 20. The X transport structure 68 includes a rail structure 70 having a rail grid 72 corresponding to the same spaced rail grid structure of the dispensing lane structure previously described above. However, the rail grid 72 is positioned above the dispensing lane structure 44 in the Z axis. Additionally, the X transport structure 68 includes a bracket 74 coupled with the rail grid 72 and attached to an actuator 76 that moves the rail grid structure 72 along an X axis as shown in the figures. Additionally, lateral support structures or members 78 may be attached to the bracket 74 of the X transport structure 68 for supporting a cup 32 as it travels along the X direction. Various actuators may be utilized to move the rail grid 72 about the X axis. For example, linear actuators may be utilized and may be calibrated such that movement does not spill a beverage after it has been filled underneath the beverage dispensing valve 66.

In one aspect, the dispensing structure 22 is a decoupled zone that allows ice to be dispensed into one cup 32 while the desired beverage is being poured simultaneously into a second cup 32, and also while the cup placement device is positioning a cup on the dispensing lane 44. This decoupled zone separates the dispense structure 22 from the cup placement device 30 and a staging structure 26, as will be discussed in more detail below.

Figure 2:
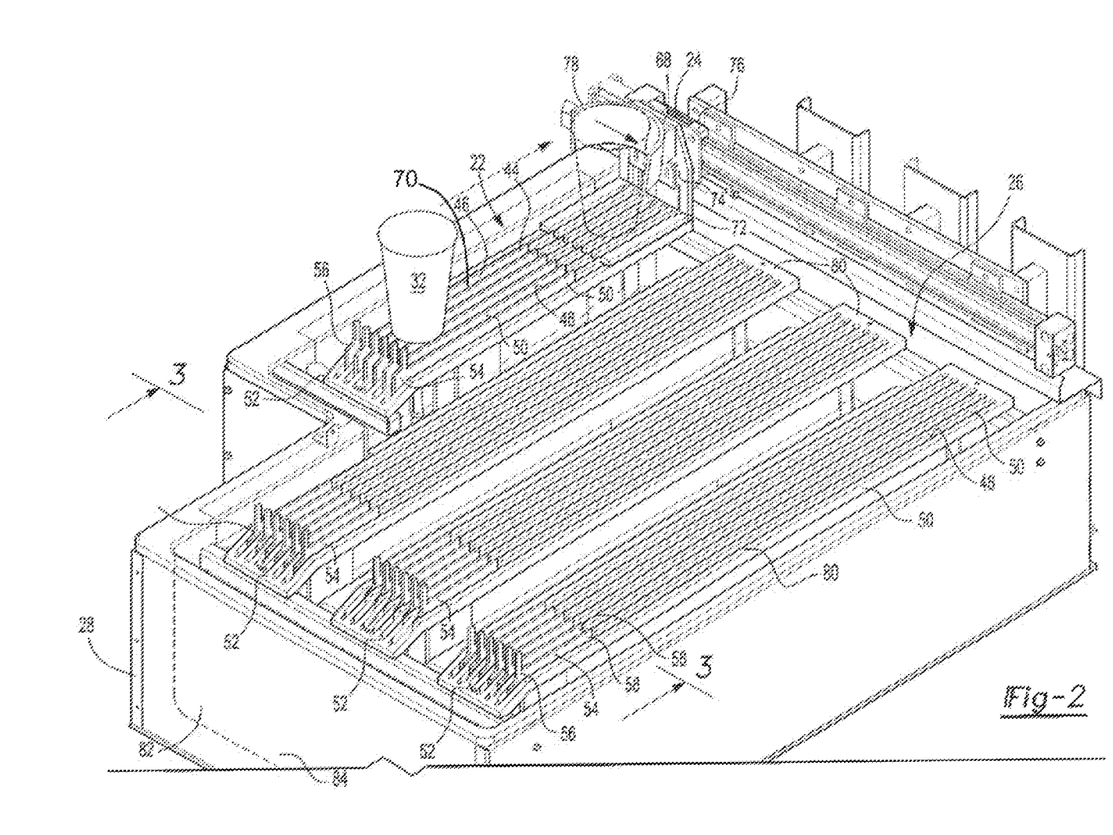
FIG. 2 is a partial perspective view of the dispensing structure, transportation mechanism and staging structure.
Figure 7:
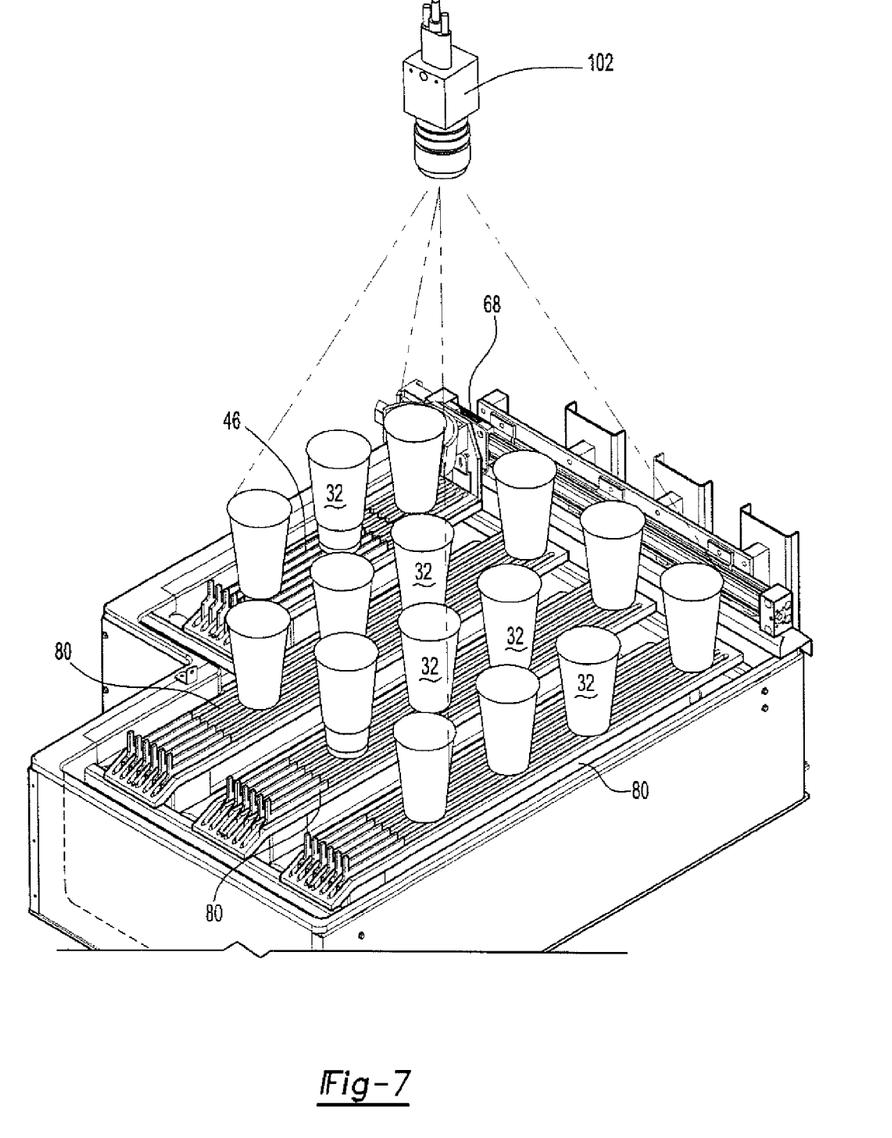
FIG. 7 is a partial perspective view of the dispensing structure, transportation mechanism and staging structure with the sensor.

Referring to FIGS. 1, 2 and 7, there is shown a staging structure 26 of the beverage dispensing apparatus 20. The staging structure 26 includes a plurality of rail grids 80 that are laterally spaced from each other along the X axis. The rail grids 80 again are the same as that described above with respect to the dispensing lane structure 44. The rail grid 80 includes a plurality of rails 50 having spaces 48 there between and an angled front edge 52 as previously described. Additionally, a lift platform 54 is positioned under each of the plurality of rail grids 80 and includes Y and Z actuators 60, 62 as described above. Again, the lift platform 54 may include a raised front edge 56 for defining a plowing structure such that ice or foreign objects that may be positioned on the rail grid 80 may be swept towards a front along the Y axis to the angled front edge 52 of the rail grid 80 such that foreign objects may be removed that can cause a cup 32 or drink to be spilled. Each of the plurality of rail grids 80 includes a plurality of positions along the Y axis of the rail grids 80 for locating filled beverage cups, as will be discussed in more detail below.

Figure 3:
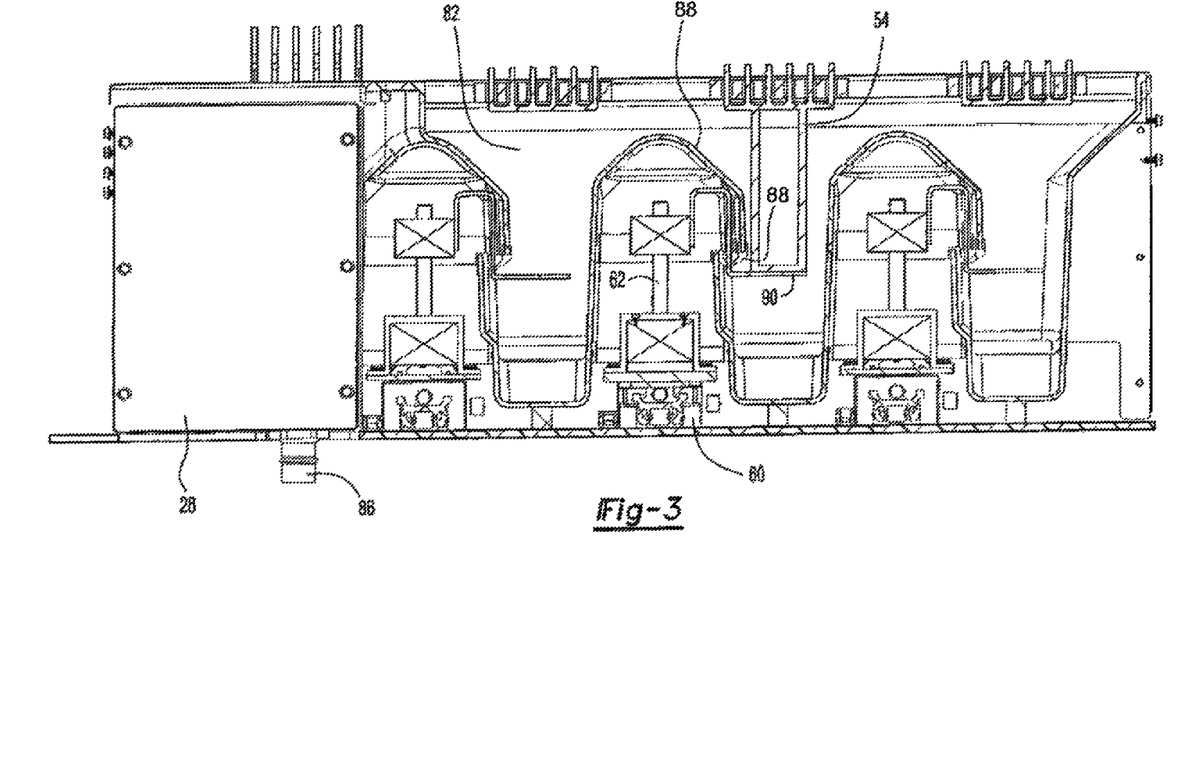
FIG. 3 is a partial sectional view of the sink structure including the housing and wipers and the lift platform.
Figure 4:
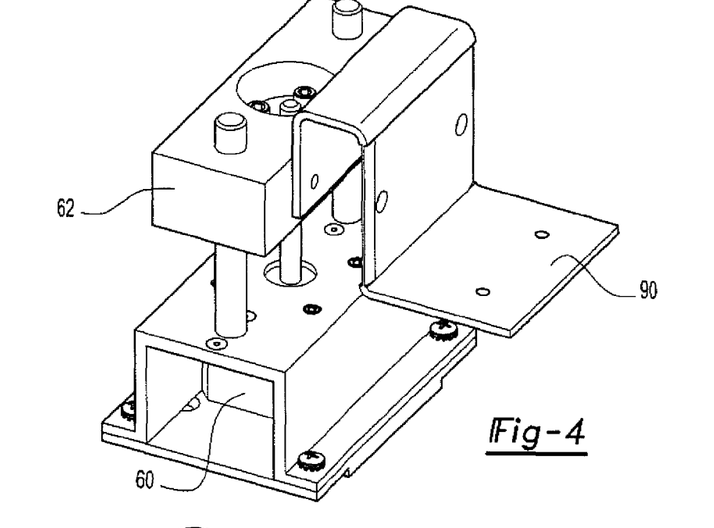
FIG. 4 is a perspective view of the actuators and bracket of the lift platform.
Figures 5, 6:
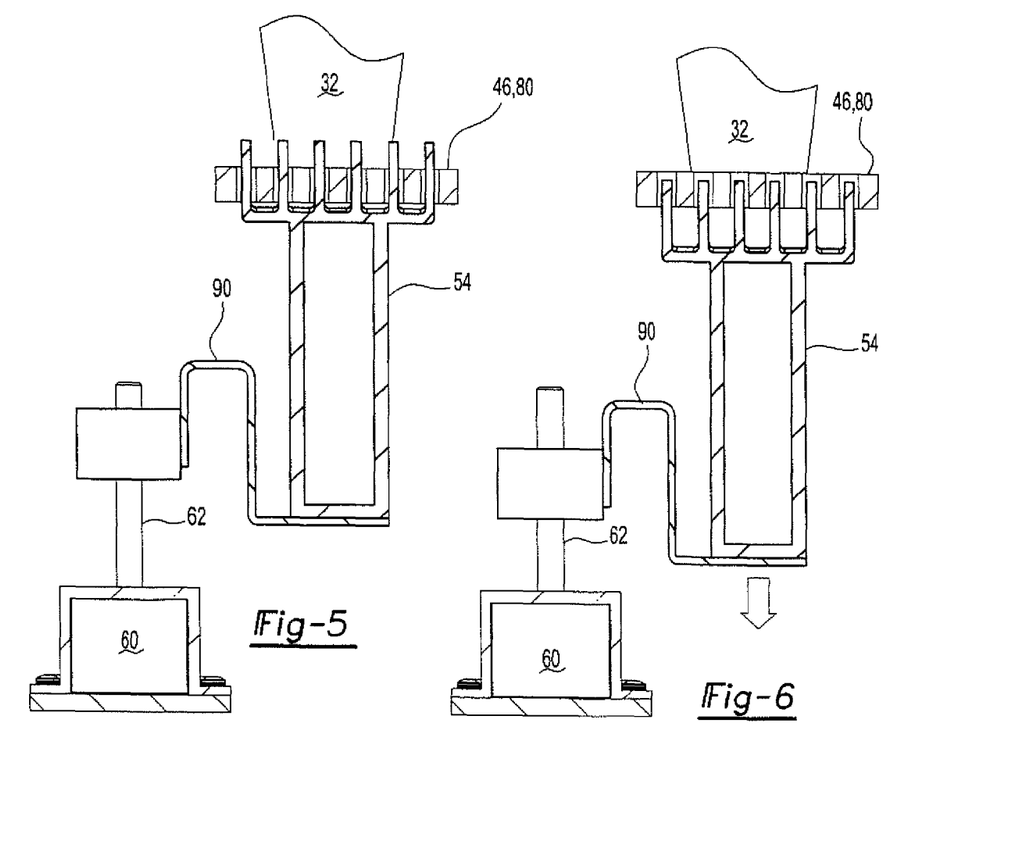
FIG. 5 is a sectional view of the actuators and lift platform of the staging structure with the platform raised.
FIG. 6 is a partial perspective view of the actuators and lift platform of the staging structure with the lift platform lowered.

The beverage dispensing apparatus 20 includes a housing 28 that surrounds the staging structure 26 as well as the dispensing structure 22 and defines a sink area 82. In one aspect, the sink area 82 includes a trough 84 positioned at a front of the apparatus relative to the angled portion 52 of the rail grids 50 such that ice or foreign objects may be caught within the trough 84. Additionally, the trough 84 may include drains 86 as seen in FIG. 3. In one aspect, a drain 86 may be positioned at all three of the staging lanes 80 and the dispensing lane 44. The drains 86 may be linked with a drain tube to allow liquid to flow to a desired area.

In one aspect, the Y and Z actuators 60, 62 associated with the lift platform 54 are protected from contact with a liquid or other object such as ice. In one aspect, the Y and Z actuators 60, 62 are located within the sink area 82. To prevent the direct contact of liquid, housings 86 including wipers 88 are positioned above the moving parts protecting them. As best shown in FIGS. 3-6, the lift platform 54 attaches to a bracket 90 that slides in between the wipers 88. In this manner, the bracket 90 makes it difficult for any liquid to penetrate to the Y and Z actuators 60, 62 positioned below.

Figure 8:
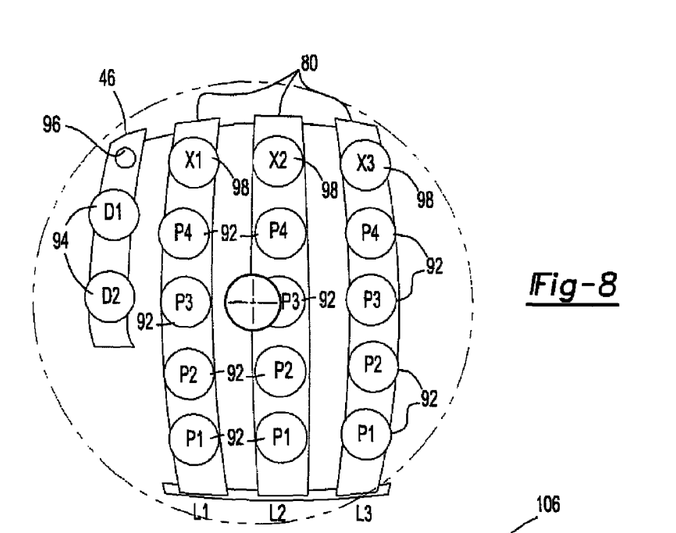
FIG. 8 is a top view showing the positions of the dispensing and staging lanes.

In one aspect, the dispense and staging structures 22, 26 as described above include a plurality of defined positions to identify where a specific beverage is located. In one aspect, the staging structure 26 may include four defined positions 92 for each of the rail grids 80 that progress together. Additionally, the dispensing structure 22 may include two dispensing positions 94 located between the ice dispense 64 and beverage valve 66 as well as an X translation position 96 that moves the filled beverage along an X axis into one of three X positions 98 on the rail grids as best seen in FIG. 8. It should be realized that various numbers of staging locations 92 and dispensing locations may be utilized. For example, the staging structure may include nine staging locations 92 rather than twelve staging locations 92. In one aspect, the twelve cup locations 92 within the staging area are independent of one another allowing for control of any location on the staging grid 80. A control system 100 can dispense the drink orders in a first-in, first-out method or an intelligent sorting type method. The control system 100 may make decisions on which order to process first based on food preparation times as well as other requirements that may be utilized such as the amount of drinks with an order as well as various other parameters from the point of sale orders.

In one aspect, the control system 100 may review outputs from a sensing system 102 such as an ultrasonic, infrared, or an optical and vision based system as shown in the figures. In this manner, the control system 100 identifies positions within the staging structure 26 as well as the dispensing structure 22. As the point of sale orders are processed and a drink is completed, the drink will be positioned in various positions in the dispensing and staging structure 22, 26. In one aspect, when the staging structure 26 is completely empty a completed drink will be positioned into lane 1, position 1 or L1, P1 as shown in FIG. 8. The control system 100 then looks to see if the next drink is within the same order and reviews the sensor feedback. If the next drink is for the same order and the first drink is still within the L1, P1 position, then the control system 100 would actuate the lift platform 54 associated with the lane 1 and position the cup 32 into L1, P2 position. If the previous drink has been removed, then the control system may move the new drink to the original position L1, P1. For example, if there are four drinks in an order and none are pulled, the fourth cup may be positioned in the L1, P4 or in the L2, P3 configuration. In this case, the first drink of the next order would then end in L3, P1.

The control system 100 repositions open staging positions 92 by back filling. The control logic is programmed such that it allows the system to always have drinks located at the front of the unit so that they may be easily accessible by an operator of the beverage dispensing apparatus 20. With each lane position being fully independent, cups 32 can be easily repositioned when the sensor provides feedback stating a cup in a specified position has been removed. For example, if P1 is removed and P2 and P3 still exist within a lane, then the control mechanism 100 can perform an operation such that the lift platform 54 is raised below the cup 32 and can move these cups up one position at a time. If P1 and P2 are both removed, then a cup in P3 can be moved to the front position P1. This movement opens up the back positions to be filled with new orders.

Additionally, if the staging structure is partially filled the control mechanism 100 may move filled cups 32 to various positions. For example, if all lanes have P1 filled with an order, the next order may fill in the next open positions. Orders may possibly be filled across multiple lanes. If only single positions are available and there are single and multiple drinks within a point of sale, then the control system 100 will populate the single orders filling in the open positions. Additionally, if there are twelve individual single orders the orders may start filling at L1, P1. As long as no cups are pulled, the next orders continue to fill up in the following progression: L2, P1; L3, P1; L1, P2 all the way through until all twelve positions are occupied.

As stated above, a sensor mechanism 102 is associated with the control system 100. Various mechanisms may be utilized such as discrete sensors positioned at each location either in the sink area or positioned above a desired location along the Y axis of the rail grid. A further option is a vision or optical type system that utilizes one camera to view the entire area, as shown in FIG. 7. In one aspect, the vision system covers the staging structure 26 as well as the dispensing 22 and transport areas 24. An optical type or vision system may utilize information provided by a camera to supplement error handling associated with the system. For example, should a cup 32 not be positioned correctly under the ice dispensing or beverage dispensing portion of the dispensing lane, the control system 100 may recognize that there is no cup 32 positioned in a desired location such that a beverage or ice is not dispensed into a cup 32 that is not present.

Figure 9:
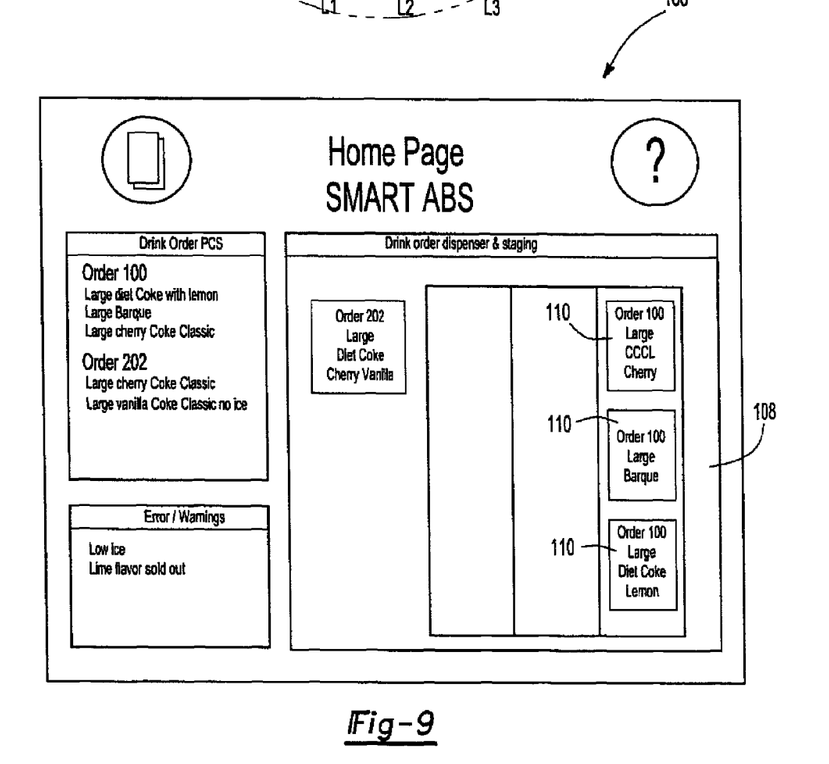
FIG. 9 is view of the cup identification system and display.

In one aspect, as depicted in FIG. 9 a cup identification system 106 is associated with the beverage dispensing apparatus 20. The cup identification system 106 may include a touch screen or information unit 108 that identifies specific locations and orders associated with the beverage dispensing apparatus 20. In one aspect, as the point of sale orders are received, the drink orders are populated on the screen 108. Each order may be identified differently using a shape or color to make it easy to identify for an operator. In one aspect, each cup identifier 110 positioned on the screen 108 indicates the order number and a size or type of drink contents. As the desired drink progresses through the beverage dispensing apparatus 20, the identifier 110 also moves on the screen 108 at the same locations corresponding to positions on the rail grids. In this manner, an operator may easily identify a desired drink associated with a specific order and know exactly where it is positioned within the beverage dispensing apparatus 20.

It is also disclosed herein a process for dispensing and locating a beverage. The process includes the step of an order being entered by an operator with a corresponding display on the cup identification system 106 displaying a drink to be dispensed. The cup 32 will then be picked by the cup placement device 30 using one of two methods. In one method, cups 32 may be stored in a linear storage system such that a linear actuator along the Y axis moves to a proper cup 32 within a plurality of tubes oriented in a single row. Alternatively, a rotary cup storage device as shown in FIG. 1 may include a cup turret that rotates to a proper cup so it is aligned with the center of the dispense lane 44. A Z actuator 40 then moves the cup 32 upward to align the suction cups 38 to the highest exposed part of the cup 32 just below the tube. Input air is then provided to the suction cup 38 such that vacuum generators 112 are actuated. Next an actuator in the Y direction 42 moves the suction cups 38 toward the cup 32 perpendicular to the center line of the cup 32 and engages with the cup 32. If vacuum sensors are utilized, a control signal will notify that a cup 32 is ready to be pulled. Next the Z actuator 40 moves the cup 32 downward and the cup 32 is then removed from the storage device. The dispense lane actuator drives forward with the platform 54 raised such that the raised front edge 56 of the platform 54 clears any ice that might exist on the dispense lane 44. Once the platform 54 has reached the front of the rail it then lowers all the way down. Next the Y actuator 42 of the cup placement device 30 moves the cup 32 towards the dispense lane 44 and pushes the cup 32 into a desired position. Input air is then closed causing the vacuum generators 112 to shut off. The Y and Z actuators 42, 40 move simultaneously down and away to place the cup 32 on the dispense lane grid underneath the ice dispenser 64. The Y actuator 42 moves the suction cups 38 to a rest position away from the dispensing zone. A gate then opens and a portion amount of ice is dispensed into the cup 32. The drink identifier 110 on the display 108 indicates that ice is dispensing into a desired cup 32. The platform 54 is then actuated in the Z direction below the cup 32 such that the cup 32 is raised above the rails 50. Following movement in the Z direction, the cup 32 is then moved along the Y axis to the position below the beverage dispensing nozzle 66. Once the cup 32 has been positioned to the desired location, the platform 54 then lowers the cup 32 onto the rails 50 on the desired beverage dispensing position. Following movement of the cup 32, a proper amount of beverage is dispensed by actuating multiple valves such that a syrup and water exit through a single dispense point nozzle. The drink identifier 110 on the display screen 108 indicates that a beverage is dispensing into a desired cup 32. The platform 54 below the dispense lane 44 following dispensing of the beverage into the cup 32 again positions below the cup 32 and actuates in a Z direction such that the cup 32 is lifted above the rails 50. Following movement in the Z direction, the platform is then moved in the Y direction such that it transports the cup 32 to the X transport structure. Once the cup is positioned on the rail grid of the X transport structure 68, the platform 54 then lowers below the dispensing lane grid 44. The X transport structure 68 moves the filled beverage along the X axis to a desired position on one of the staging lanes 80. Once the X transport structure is positioned along a desired lane 80, the lift platform 54 below that lane actuates in a Y direction directly underneath the X transport structure 68 and lifts the filled drink to a desired position along the Y axis of a desired staging lane 80. The control mechanism 100 provides instructions for the X transport structure 68 as well as the various lift platforms 54 of the staging lanes 80 such that drinks may be stationed within one of the staging positions based on order sequence and location availability. The staging lanes 80 as indicated above may be equipped with a sensing system 102 that states whether a cup or object exists in a desired location. The drink identifier 110 associated with the display 108 moves to that location in the staging lane once the beverage has been positioned within a specific location. In one aspect, the identifier 110 includes the order number as well as a size and drink contents for an individual cup. Once a location has been vacated by an operator removing the cup, the staging Y and X actuators and lift platforms 54 move various other cups 32 to back fill empty spaces within the staging lanes 80.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A process for dispensing, a beverage into a cup comprising the steps of:
    (A) providing a dispensing structure;
    (B) providing a transportation mechanism linked with the dispensing structure;
    (C) providing a staging structure linked with the transportation mechanism;
    (D) providing a control system linked with the dispensing structure, staging structure and the transportation mechanism;
    (E) providing a sensor mechanism linked with the control system, the sensor mechanism providing signals indicating the position of a cup;
    (F) providing a cup identification system having an interactive display connected to the control system;
    (G) picking a cup from a storage device and positioning it within the dispensing structure, comprising:
        (i) moving a Z actuator attached to a cup placement device to align suction cups with the cup in the storage device;
        (ii) providing input air to the suction cups and actuating a vacuum generator;
        (iii) moving a Y actuator attached to the cup placement device such that the suction cups contact the cup perpendicular to the center line of the cup; and
        (iv) moving a Z actuator such that the cup is moved downward from the storage device and positioned on a dispensing lane of the dispensing structure; and
        (v) closing the input air to shut off the vacuum generator to release the cup on the dispensing lane;
    (H) dispensing ice and a beverage into the cup on the dispensing lane at separate locations within the dispensing structure to prepare a filled cup;
    (I) transporting the filled cup to a staging structure;
    (J) positioning, the filled cup in the staging structure:
    (K) removing the filled cup from the staging structure for sale to a customer wherein the cup identification system and the interactive display outputs visual characteristics indicating the position and characteristics of the cup and the filled cup at every stage of the process.

2. The process for dispensing a beverage into a cup of claim 1 wherein the dispensing structure is decoupled from the transportation mechanism and staging structure.

3. The process for dispensing a beverage into a cup of claim 1 including the step of inputting an order by an operator with a corresponding output of the order on the cup identification and display.

4. The process for dispensing a beverage into a cup of claim 1 wherein the step of picking a cup from a storage device includes accessing the cups from a linear storage structure, moving the Z actuator attached to the cup placement device to align the suction cups with the cup in the linear storage structure.

5. The process for dispensing a beverage into a cup of claim 1 wherein the dispensing lane comprises a rail grid including a plurality of separated rails raving spaces there between.

6. The process for dispensing a beverage into a cup of claim 5 wherein the dispensing structure includes a lift platform having a plurality of spaced rails and a raised front edge wherein the rails of the lift platform are positioned to move within spaces of the rail grid of the dispensing lane in the Y and Z axes and including Y and Z actuators connected to the lift platform moving the lift platform up and down on the Z axis relative to the rail grid and along the Y axis of the rail grid.

7. The process for dispensing a beverage into a cup of claim 6 wherein the step of positioning the cup on the dispensing structure includes moving, the lift platform upward in the Z direction and moving the lift platform forward in the Y direction wherein the raised edge of the lift platform removes ice or debris from the rail grid of the dispensing lane.

8. The process for dispensing a beverage into a cup of claim 7 wherein the lift platform is lowered when reaching a front of the rail grid, of the dispensing lane.

9. The process for dispensing a beverage into a cup of claim 8 wherein the step of dispensing ice and beverage into the cup includes opening a gate on an ice storage device dispensing a specified amount of ice and displaying that ice is being poured into the cup on the cup identification system.

10. The process for dispensing a beverage into a cup of claim 9 wherein following the pouring of ice the a lift platform is actuated up in a Z direction underneath the cup moving the cup off of the rail grid of the dispensing lane followed by movement in the Y axis positioning the cup below a beverage dispensing nozzle.

11. The process for dispensing a beverage into a cup of claim 10 wherein after the step of claim 10 the lift platform is actuated down in the Z direction positioning the cup on the rail grid of the dispensing lane followed by dispensing of a predetermined amount of beverage into the cup to prepare the filled cup with display of the dispensing of the beverage on the cup identification system.

12. The process for dispensing a beverage into a cup of claim 11 wherein after the step of claim 11 the lift platform is actuated up in a Z direction underneath the filled cup moving the filled cup off of the rail grid of the dispensing lane followed by the movement in the Y axis positioning the filled cup in the transportation mechanism.

13. The process for dispensing a beverage into a cup of claim 12 wherein following the step of claim 12 the lift platform is actuated down in the Z direction placing the filled cup on a rail grid of the transportation mechanism.

14. The process for dispensing a beverage into a cup of claim 13 wherein the step of transporting the filled cup to a staging area includes moving the rail grid of the transportation mechanism in a direction along the X axis and positioning the transportation mechanism above a desired staging lane structure.

15. The process for dispensing a beverage into a cup of claim 1 wherein the step of positioning the filled cup in the staging structure includes actuating, a lift, platform positioned below the staging structure in an upward Z direction lifting the cup off of the transportation mechanism.

16. The process for dispensing a beverage into a cup of claim 15 wherein following the step of claim 15 an actuator of the lift platform a actuates and moves the lift platform in a Y direction positioning the filled cup in a desired location along a Y axis of the staging structure.

17. The process for dispensing a beverage into a cup of claim 16 wherein following the step of claim 16 the actuator in the Z direction moves downward in the Z direction placing the filled cup at a desired position on the staging structure and displays the position of the filled cup on the cup identification system.

18. The process for dispensing a beverage into a cup of claim 1 wherein the control system groups filled cups on the staging structure according to as number of drinks in an order and provides a visual cue on the cup identification system of all drinks within an order.

19. The process for dispensing a beverage into a cup of claim 1 wherein the control system backfills locations of filled cups on the staging structure after an operator removes a drink from the staging structure.

20. A process for dispensing a beverage into a cup comprising the steps of:
 (A) picking a cup from a storage device and positioning it within a dispensing structure, comprising:
  (i) moving a Z actuator attached to a cup placement device to align suction cups with the cup in the storage device;
  (ii) providing input air to the suction cups and actuating a vacuum generator;
  (iii) moving a Y actuator attached to the cup placement device such that the suction cups contact the cup perpendicular to the center line of the cup; and
  (iv) moving a Z actuator such that the cup is moved downward from the storage device and positioned on a dispensing lane of the dispensing structure; and
  (v) closing the input air to shut off the vacuum generator to release the cup on the dispensing lane;
 (B) dispensing ice and a beverage into the cup on the dispensing lane at separate locations within the dispensing structure to prepare a filled cup;
 (C) transporting the filled cup to a staging structure;
 (D) positioning the filled cup in the staging structure; and
 (E) removing the filled cup from the staging structure for sale to a customer wherein a cup identification system and display outputs visual characteristics indicating the position and characteristics of the cup and the filled cup at every stage of the process.

21. The process for dispensing a beverage into a cup of claim 20 wherein the dispensing lane comprises a rail grid including a plurality of separated rails having spaces there between.

22. The process for dispensing a beverage into a cup of claim 21 wherein the dispensing structure includes a lift platform having a plurality of spaced rails and a raised front edge wherein the rails of the lift platform are positioned to move within spaces of the rail grid of the dispensing lane in Y and Z axes.

23. The process for dispensing a beverage into a cup of claim 20 wherein the step of transporting the filled cup to a staging structure is performed by a transportation mechanism that includes an X transport structure positioned along a back of the beverage dispensing apparatus and wherein the X transport structure includes an X rail grid structure positioned above a rail grid structure of a dispensing lane rail grid structure, the X rail grid including a plurality of rails having spaces there between.

24. The process for dispensing a beverage into a cup of claim 20 wherein the staging structure includes a plurality of rail grids laterally spaced from each other on an X axis wherein each of the plurality of rail grids includes a plurality of separated rails having spaces there between and an angled front edge.

25. The beverage dispensing apparatus of claim 24 wherein each of the plurality of rail grids includes a lift platform having a plurality of spaced rails and a raised front edge and wherein the rails of the lift platform are positioned to move within spaces of the rail grid of a staging lane in Y and Z axes.

26. A process for dispensing a beverage into a cup comprising the steps of:
 (A) picking a cup from a storage device and positioning it within a dispensing structure;
 (B) dispensing ice and a beverage into the cup at separate locations within the dispensing structure to prepare a filled cup;
 (C) transporting the filled cup to a staging structure;
 (D) positioning the filled cup in the staging structure; and
 (E) removing the filled cup from the staging structure for sale to a customer wherein a cup identification system and display outputs visual characteristics indicating the position and characteristics of the cup and the filled cup at every stage of the process;
wherein the dispensing structure includes a dispensing lane having a rail grid including a plurality of separated rails having spaces there between and the dispensing structure includes a lift platform having a plurality of spaced rails and a raised front edge wherein the rails of the lift platform are positioned to move within spaces of the rail grid of the dispensing lane in Y and Z axes.

* * * * *

UNITED STATES PATENT AND TRADEMARK OFFICE
CERTIFICATE OF CORRECTION

| | | |
|---|---|---|
| PATENT NO. | : 9,045,323 B2 | Page 1 of 1 |
| APPLICATION NO. | : 13/625144 | |
| DATED | : June 2, 2015 | |
| INVENTOR(S) | : Bryant Crane et al. | |

It is certified that error appears in the above-identified patent and that said Letters Patent is hereby corrected as shown below:

Claims

In claim 1, at column 7, line 25, delete the "," between "dispensing" and "a beverage".

In claim 1, at column 7, line 59, delete the "," between "positioning" and "the".

In claim 1, at column 7, line 59, at the end of the line, delete the ":" and insert a --;--.

In claim 5, at column 8, line 13, "raving" should instead read --having--.

In claim 7, at column 8, line 22, delete "of claim" in the first occurrence.

In claim 8, at column 8, line 31, delete the "," between "grid" and "of".

In claim 10, at column 8, line 38, delete the "a" between "the" and "lift".

In claim 15, at column 9, line 1, delete the "," between "actuating" and "a".

In claim 15, at column 9, line 1, delete the "," between "lift" and "platform".

In claim 16, at column 9, line 6, delete the "a" between "platform" and "actuates".

Signed and Sealed this
Fifteenth Day of September, 2015

Michelle K. Lee
*Director of the United States Patent and Trademark Office*